UNITED STATES PATENT OFFICE.

ADOLF GORHAN, OF LIESING, NEAR VIENNA, AUSTRIA-HUNGARY.

METHOD OF PURIFYING ACETIC ACID.

1,210,792.

Specification of Letters Patent.

Patented Jan. 2, 1917.

No Drawing.   Application filed May 21, 1915.   Serial No. 29,699.

*To all whom it may concern:*

Be it known that I, ADOLF GORHAN, a subject of the Emperor of Austria-Hungary, and resident of Liesing, near Vienna, Austria-Hungary, have invented certain new and useful Improvements in the Methods of Purifying Acetic Acid, of which the following is a specification.

The present invention relates to a method of purifying acetic acid by removing therefrom the formic acid and other impurities it may contain.

The raw acetic acid obtained by distilling wood always retains small quantities of formic acid besides empyreumatic impurities. The problem of freeing the acetic acid during rectification from the formic acid in order to obtain a pure product is highly important and many manufacturers have striven in vain to find a solution which would give full satisfaction. They usually tried to get rid of the formic acid by treating the acetic acid with oxidizing agents such as permanganate. This method however is not commercial on account of the high price of the oxidizing agents as well as of the early destruction of the copper stills commonly in use, which inevitably results therefrom. Moreover the formic acid cannot be entirely removed by this process.

It has now been ascertained that it is possible to entirely remove the formic acid as well as the empyreumatic substances from raw acetic acid if it is mixed with sulfuric acid and the mixture is then subjected to distillation under suitable conditions.

It is well known that concentrated sulfuric acid will cause formic acid to be decomposed into carbon monoxid and water. This reaction is commonly used by analytical chemists for determining the quantity of formic acid mixed with acetic acid. The experiments made with a view to utilizing this analytical method for the technical removal of the formic acid were, however, unsuccessful at first owing to the fact that also part of the acetic acid is decomposed by the sulfuric acid, carbon dioxid, sulfurous acid and carbon being formed. Further experiments have, however, given an unexpected result: a complete removal of the formic acid and other impurities from the acetic acid and a separation without losses of the acetic acid from the sulfuric acid is obtained, if a mixture of almost equal parts of acetic acid and a sulfuric acid of about 70 per cent. is subjected to distillation, preferably in such a way that the temperature of the mixture is kept not much above the boiling point of the acetic acid. If these rules are followed the formic acid as well as the empyreumatic substances are completely destroyed while the acetic acid itself is not attacked at all and is easily separated from the sulfuric acid without being destroyed and without any sulfuric acid being distilled over. In order to keep the mixture at the required temperature, it is preferable to add to the mixture while the distillation is proceeding, as much acetic acid as is being driven over, or else to distil *in vacuo.* Of course it is quite feasible also to work intermittently, but in this case owing to variations in the concentration and temperature losses of acetic acid are almost inevitable.

If a mixture is treated which contains 49 parts (by weight) of acetic acid of 100 per cent., 36 parts of sulfuric acid of 92 per cent., and 15 parts of water, and if into this mixture acetic acid of say 90 per cent. is allowed to flow continuously, the concentration of the acids within the still will be kept automatically constant and an acetic acid of constant concentration corresponding to the concentration of the acid flowing in, in the present case of 90 per cent., will distil over. A like success is obtained if acetic acid of 80, 85, 95 per cent. or a still higher concentration is added continuously to the mixture. The process is operative, although less successfully, with an acetic acid of lower concentration, but as a rule 70 per cent. will be the lowest limit.

The proportion of the acids forming the mixture as well as the temperatures of the mixture and of the acetic acid distilling off may vary within certain limits. In general, it is preferable to proceed in such a way that the distillation of the acetic acid flowing off takes place at 130 degr. C. and at ordinary pressure and that the proportion of acids in the mixture is kept constant by continuously feeding in fresh acetic acid. It is important, of course, to have so much water present in the mixture that a decomposition of the acetic acid is avoided, but it is immaterial whether the water required is brought in as such or in combination with one of the acids.

By working after the method described hundred per cent. of an acetic acid are obtained which is practically free of formic acid and other impurities, practically no chemicals being consumed, as one and the same quantity of sulfuric acid will serve for a great number of operations.

I claim:

1. The method of removing formic acid and empyreumatic substances from acetic acid which comprises subjecting to distillation, at a temperature above that at which formic acid is decomposed and below that at which acetic acid is decomposed, a mixture of raw acetic acid, concentrated sulfuric acid and a diluting agent, the latter being in such proportion that the sulfuric acid will not affect the acetic acid at distillation temperature of the latter.

2. The method of removing formic acid and empyreumatic substances from acetic acid comprising mixing with raw acetic acid concentrated sulfuric acid of such strength that it will not injuriously affect the acetic acid at distillation temperature of acetic acid, and subjecting the mixture to a temperature above the temperature of decomposition of formic acid but below the temperature of decomposition of acetic acid.

3. The method of removing formic acid and empyreumatic substances from acetic acid which comprises subjecting to distillation, at a temperature above that at which formic acid is decomposed and below that at which acetic acid is decomposed, a mixture of raw acetic acid, concentrated sulfuric acid and water, the latter being in such proportion that the sulfuric acid will not affect the acetic acid at distillation temperature of the latter.

4. Method of removing formic acid and empyreumatic substances from acetic acid, which consists in subjecting a mixture of substantially equal parts of acetic acid and of sulfuric acid of 70 per cent. to distillation at a temperature above the temperature of decomposition of formic acid but below the temperature of decomposition of acetic acid.

5. Method of removing formic acid and empyreumatic substances from acetic acid, which consists in subjecting a mixture of substantially equal parts of acetic acid and of sulfuric acid of 70 per cent. to distillation at a temperature not far above the boiling point of acetic acid.

6. The method of removing formic acid and empyreumatic substances from acetic acid which comprises subjecting to distillation, at a temperature above that at which formic acid is decomposed and below that at which acetic acid is decomposed, a mixture of raw acetic acid and concentrated sulfuric acid of such strength that it will not injuriously affect the acetic acid at distillation temperature of acetic acid, and continuously supplying to the mixture an amount of fresh raw acetic acid corresponding to the pure acetic acid distilled over.

7. The method of removing formic acid and empyreumatic substances from raw acetic acid which comprises subjecting to distillation *in vacuo*, at a temperature above that at which formic acid is decomposed and below that at which acetic acid is decomposed, a mixture of raw acetic acid and concentrated sulfuric acid of such strength that it will not injuriously affect the acetic acid at distillation temperature of acetic acid.

8. The method of removing formic acid and empyreumatic substances from acetic acid which comprises subjecting to distillation, at a temperature above that at which formic acid is decomposed and below that at which acetic acid is decomposed, a mixture of substantially equal parts of raw acetic acid and concentrated sulfuric acid of such strength that it will not injuriously affect the acetic acid at distillation temperature of acetic acid.

In testimony whereof I have signed my name to this specification in the presence of two subscribing witnesses.

DR. ADOLF GORHAN.